(12) United States Patent
Doshi et al.

(10) Patent No.: US 7,765,256 B2
(45) Date of Patent: Jul. 27, 2010

(54) DIAGNOSTIC FUNCTIONALITY FOR WIRELESS CLIENT CONNECTIVITY PROBLEMS IN WIRELESS NETWORKS

(75) Inventors: Bhautik Doshi, Fremont, CA (US); Robert B. O'Hara, Jr., Santa Clara, CA (US); Ranganatha Marathe, Santa Clara, CA (US); Bijuraj Raju, Bangalore (IN); Ambika Prasad Mohanty, Bangalore (IN); Pramod Badjate, Los Altos, CA (US); Amish Gambhir, Bangalore (IN); Premnath Narayanan, Bangalore (IN)

(73) Assignee: Cisco Technology, Inc., San Jose, CA (US)

( * ) Notice: Subject to any disclaimer, the term of this patent is extended or adjusted under 35 U.S.C. 154(b) by 217 days.

(21) Appl. No.: 11/958,039

(22) Filed: Dec. 17, 2007

(65) Prior Publication Data

US 2009/0113244 A1 Apr. 30, 2009

Related U.S. Application Data

(63) Continuation of application No. 11/928,176, filed on Oct. 30, 2007.

(51) Int. Cl.
*H04B 17/00* (2006.01)
(52) U.S. Cl. .................. 709/203; 709/224; 709/232; 455/67.13
(58) Field of Classification Search .................. 709/203, 709/224, 232; 455/67.13
See application file for complete search history.

(56) References Cited

U.S. PATENT DOCUMENTS

| | | | | |
|---|---|---|---|---|
| 7,230,528 | B2 * | 6/2007 | Kates | 340/521 |
| 7,451,316 | B2 * | 11/2008 | Halasz et al. | 713/171 |
| 2003/0208113 | A1 * | 11/2003 | Mault et al. | 600/316 |
| 2006/0252376 | A1 * | 11/2006 | Fok et al. | 455/67.13 |
| 2007/0105546 | A1 | 5/2007 | Linkert et al. | 455/423 |

FOREIGN PATENT DOCUMENTS

WO  WO 2006/102505 A1  9/2006

OTHER PUBLICATIONS

PCT/US2008/081674, Notification of Transmittal of the International Search Report and the Written Opinion of the International Searching Authority, or the Declaration, EPO, Apr. 6, 2009.
Geier, *Troubleshooting your 802.11 WLAN*, www.wifiplanet.com/tutorials/article.php/953571, Jan. 11, 2002.
*Wireless Troubleshooting*, Microsoft TechNet, http://technet2.microsoft.com/WindowsServer/en/Library/ecc10b32-898a-435f-9d5c-01c25fb4d1f61033.mspx, updated Jan. 21, 2005.

\* cited by examiner

*Primary Examiner*—Khanh Q Dinh
(74) *Attorney, Agent, or Firm*—Baker Botts L.L.P.

(57) ABSTRACT

A troubleshooting system. In particular implementations, a method includes collecting, from a first wireless network element, PEM state associated with a wireless client having a connection problem, and collecting log data associated with the wireless client from the first wireless network elements and one or more other wireless network elements. The method further includes correlating the PEM state and log data based on a network security protocol employed by the wireless client, where the network security protocol corresponds to an expected sequence of events. The correlating includes correlating events and messages collected based on the expected sequence of events, and comparing the correlated sequence of events to a data store of diagnostic information to identify one or more possible causes of the connection problem.

21 Claims, 12 Drawing Sheets

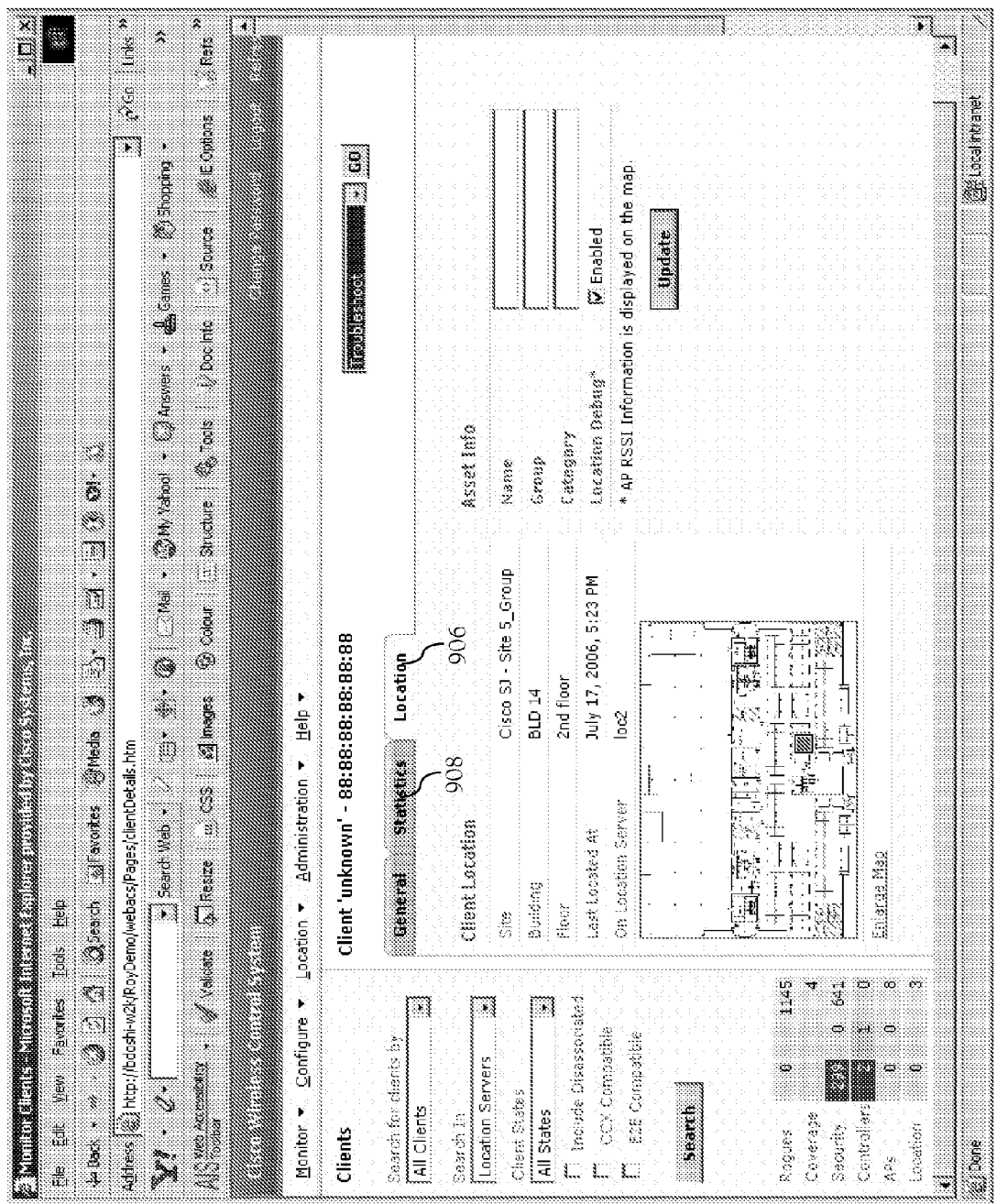
Fig._9

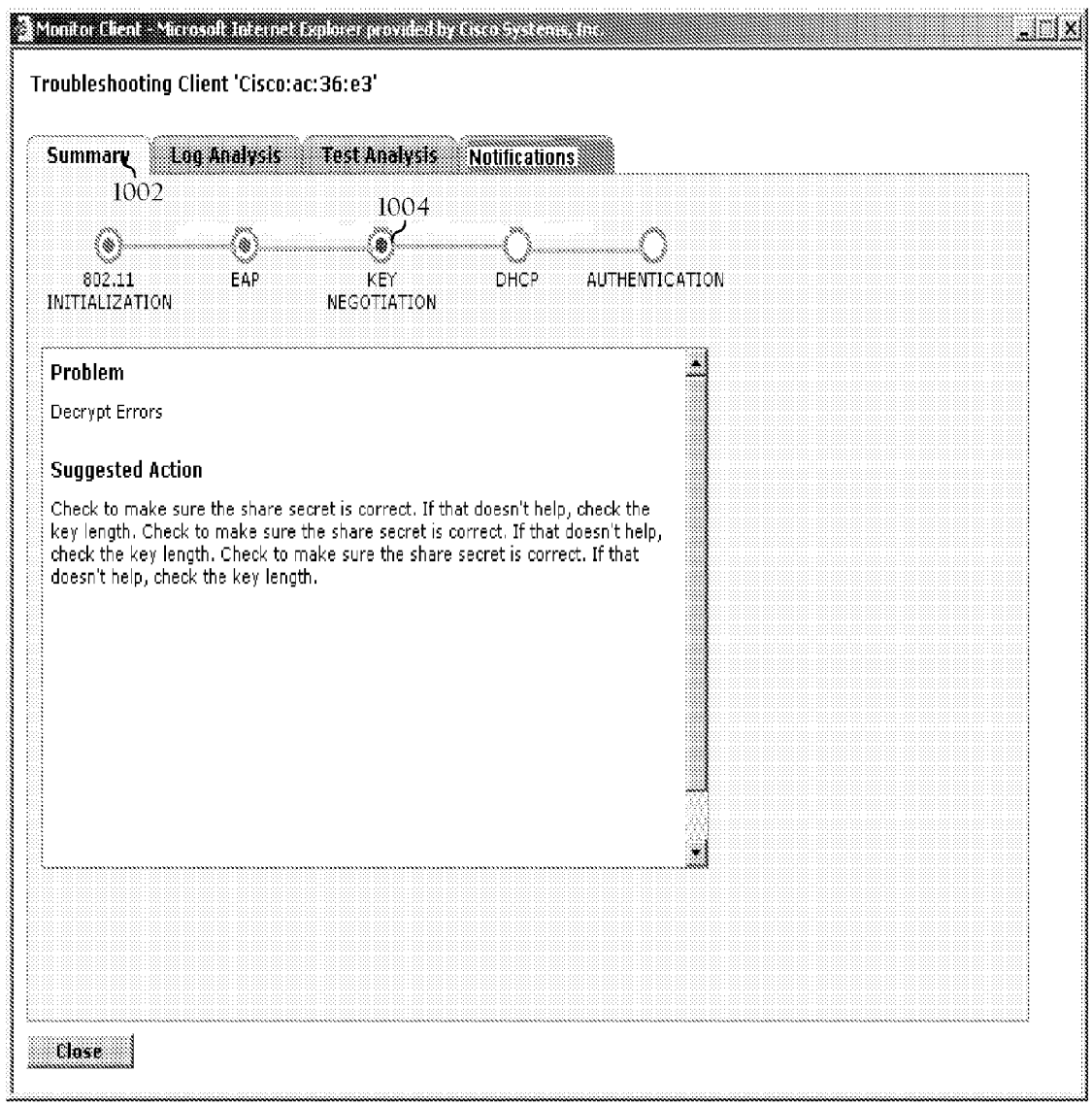
Fig._10

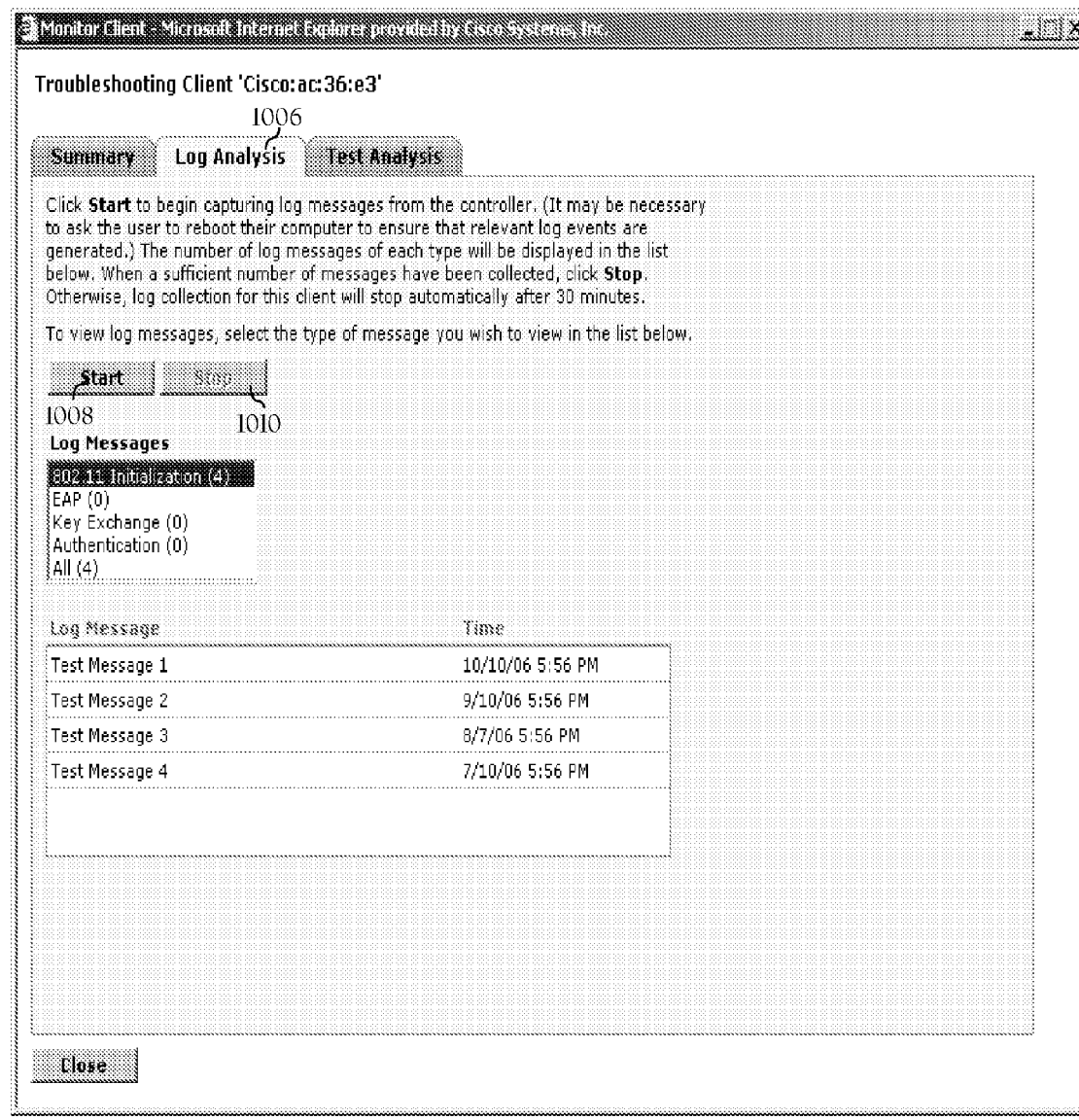
Fig._11

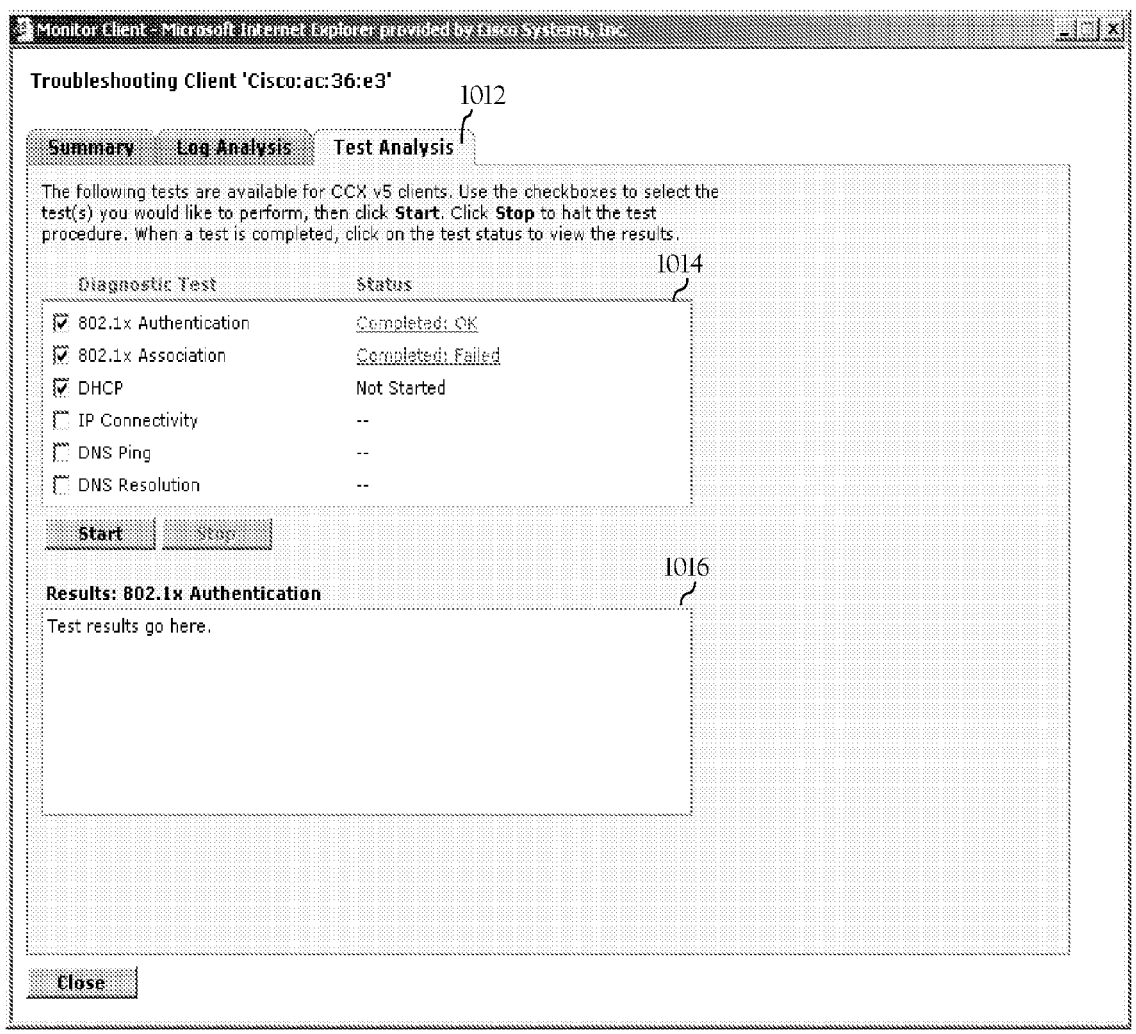
Fig._12

DIAGNOSTIC FUNCTIONALITY FOR WIRELESS CLIENT CONNECTIVITY PROBLEMS IN WIRELESS NETWORKS

CROSS-REFERENCE TO RELATED APPLICATION

The present application is a continuation of U.S. application Ser. No. 11/928,176 filed Oct. 30, 2007, which is incorporated by reference herein for all purposes.

TECHNICAL FIELD

The present disclosure relates generally to wireless networks.

BACKGROUND

Market adoption of wireless LAN (WLAN) technology has exploded, as users from a wide range of backgrounds and vertical industries have brought this technology into their homes, offices, and increasingly into the public air space. This inflection point has highlighted not only the limitations of earlier-generation systems, but also the changing role that WLAN technology now plays in people's work and lifestyles across the globe. Indeed, WLANs are rapidly changing from convenience networks to business-critical networks. Increasingly users are depending on WLANs to improve the timeliness and productivity of their communications and applications, and in doing so, require greater visibility, security, management, and performance from their network.

When a wireless client has a connectivity problem in a wireless network, the end-user of the wireless client may generate and send a trouble ticket to a network administrator who can then troubleshoot the problem. The network administrator, however, typically has very little information available to debug the problem remotely. The network administrator may have access to the wireless client's current information and historical graphs on association history. However, this information may be limited. Some solutions provide indexing functions that index system logs from different network systems, but such solutions have no intelligence to identify problems.

DESCRIPTION OF THE DRAWINGS

FIG. 9 illustrates an example graphical user interface showing a location information portion of the client details page.

FIG. 10 illustrates an example graphical user interface showing a summary section of a troubleshoot wizard.

FIG. 11 illustrates an example graphical user interface showing a log analysis section of the troubleshoot wizard.

FIG. 12 illustrates an example graphical user interface showing a test analysis section of the troubleshoot wizard.

DESCRIPTION OF EXAMPLE EMBODIMENTS

A. Overview

Particular implementations facilitate troubleshooting of wireless client connectivity problems in a wireless network. In one implementation, the present invention provides diagnostic function that is integrated with functionalities of an external trouble ticket system to perform live troubleshooting or to perform scheduled troubleshooting. In particular implementations, the trouble ticket may be user invoked, or the WLAN management server may automatically initiate the troubleshooting process when the WLAN management server becomes aware of a connectivity problem. The WLAN management server then applies an appropriate troubleshoot policy depending on whether the cause of the connection problem is associated with the wireless client or associated with the wireless network infrastructure. For example, if the problem is associated with the wireless client side, the WLAN management server may send an asynchronous report to a trouble ticket system when the troubleshoot analysis and identified problem is available, automatically close the trouble ticket once the WLAN management server identifies the problem, and send an email to the end user with suggestions for corrective action. If the problem is associated with the wireless network infrastructure, the WLAN management server may send an asynchronous report to the trouble ticket system. In one implementation, the report may include the identified problem and suggested corrective actions for a network administrator. If the problem is not identified, the report may include a new trouble ticket and troubleshooting information to facilitate a network administrator in identifying the problem.

According to particular implementations, the present invention allows live troubleshooting where various elements of the wireless network log data associated with the connection states of a given wireless client that is having connection problems. Such wireless network nodes may include wireless access points, central controllers, routers, authentication authorization accounting (AAA) servers, location servers, dynamic host configuration protocol (DHCP) servers, etc. A WLAN management server determines the current connection state of the wireless client and analyzes various current and historical log data provided by the various wireless network nodes, and correlates the log data with particular security protocols to determine possible causes of the connection problems. In one implementation, the WLAN management server reports the data logs, possible causes of the connectivity problem, and possible solutions for the problems to a network administrator for corrective action. A variety of services can be constructed that utilize or take advantage of this data gathering function. The WLAN management server may provide this troubleshooting functionality live (e.g., on-demand) or according to a schedule.

B. Example Wireless Network System Architecture

B.1. Network Topology

Figure 1:
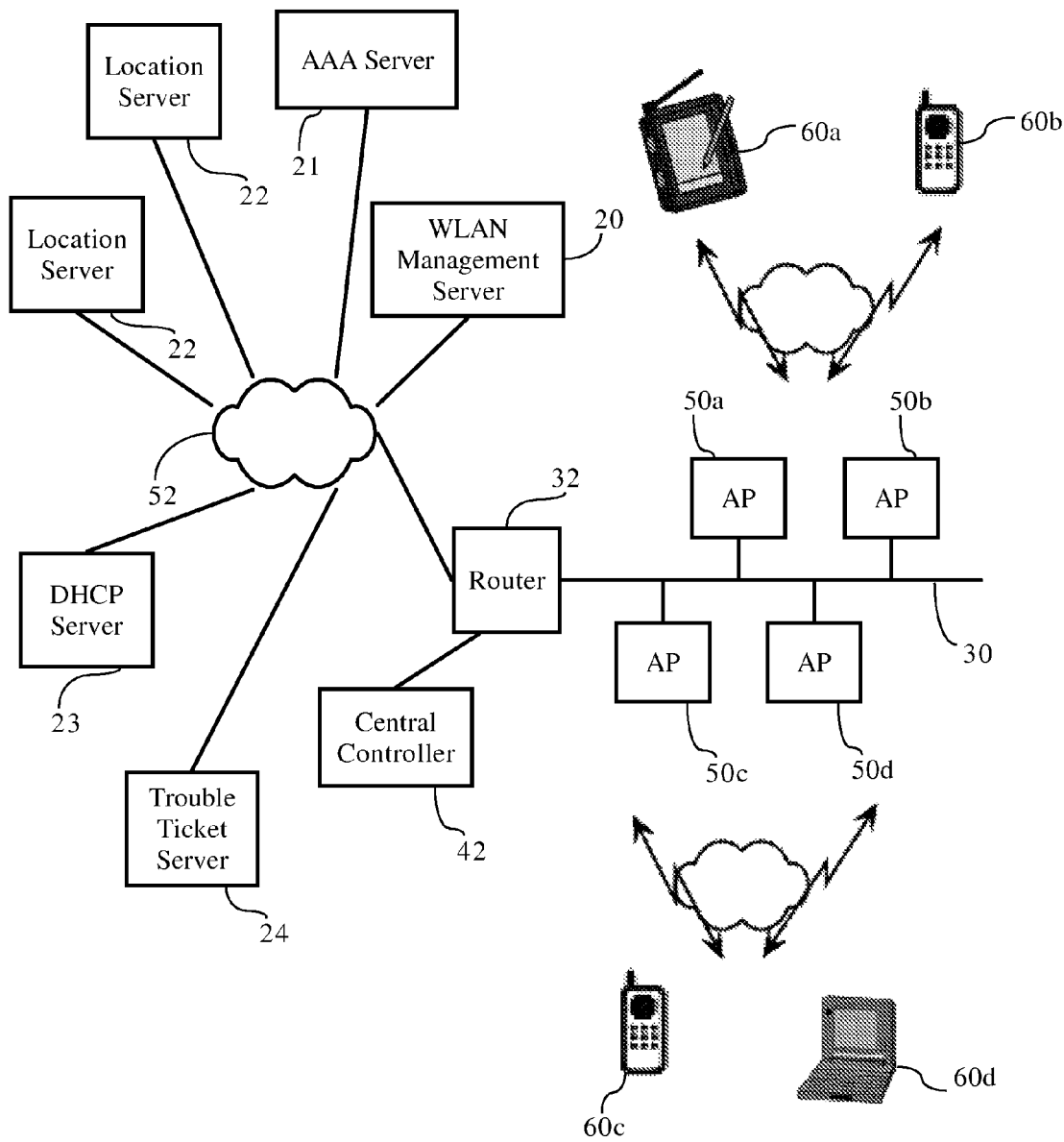
FIG. 1 illustrates example components in a wireless local area network (WLAN) system.

FIG. 1 illustrates example components in a wireless local area network (WLAN) system. In a specific embodiment of the present invention, the system includes a WLAN management server 20, one or more Authentication Authorization and Account (AAA) servers 21, one or more location servers 22, one or more dynamic host configuration protocol (DHCP) servers 23, a trouble ticket server 24, and a central controller 42, a local area network (LAN) 30, a router 32, and wireless access points 50a, 50b, 50c, and 50d. LAN 30 is implemented by a switch (or an array of switches) and/or other network devices, such as a bridge.

As FIG. 1 illustrates, these network elements are operably connected to a network 52. Network 52, in one implementation, generally refers to a computer network, such as a LAN, a WAN, etc., that includes one or more intermediate network devices (e.g., routers, switches, etc.), which allow for the transmission of messages between WLAN management server 20 and wireless clients via wireless access points 50. Of course, network 52 can include a variety of network segments, transmission technologies and components, such as terrestrial WAN links, satellite links, optical fiber links, and cellular links. Network 52 could also be a campus LAN. LAN 30 may be a LAN, LAN segments implemented by an Ethernet switch (not shown), or an array of switches having multiple ports to which wireless access points 50 are connected. The wireless access points 50 are typically connected to switch ports via Ethernet links; however, other link layer connection protocols or communication means can be employed. FIG. 1 illustrates one possible network environment in which the invention may operate; however, other implementations are possible. For example, although WLAN management server 20 is illustrated as being on a different LAN or LAN segment, it may be co-located with wireless access points 50.

The wireless access points 50 are operative to wirelessly communicate with remote wireless client devices 60a, 60b, 60c, and 60d. In one implementation, the wireless access points 50 implement the wireless network protocol specified in the IEEE 802.11 WLAN specification; of course, other wireless network protocols may be used. The wireless access points 50 may be autonomous or so-called "fat" wireless access points or light-weight wireless access points operating in connection with a wireless switch (not illustrated). In addition, the network infrastructure may also include a Wireless LAN Solution Engine (WLSE) offered by Cisco Systems, Inc. of San Jose, Calif. or another wireless network management system. In some implementations, the network infrastructure may also include one or more Wireless Control System (WCS) nodes operative to manage one or more wireless switches and access points.

B.2. WLAN Management Server

Figure 2:
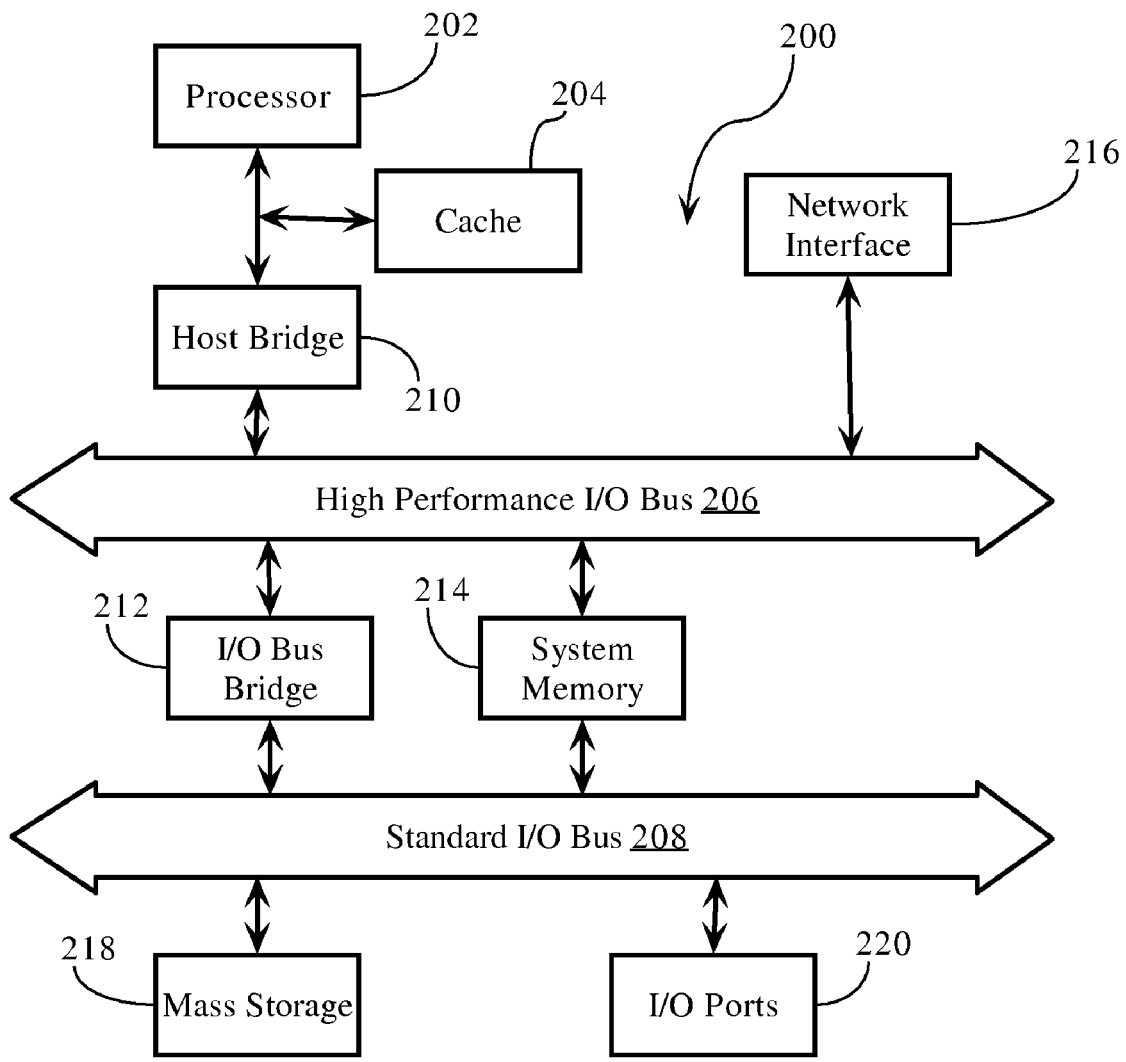
FIG. 2 illustrates an example hardware system, which may be used to implement a WLAN management server.

FIG. 2 illustrates an example hardware system 200, which may be used to implement a WLAN management server 20. In one implementation, hardware system 200 comprises a processor 202, a cache memory 204, and one or more software applications and drivers directed to the functions described herein. Additionally, hardware system 200 includes a high performance input/output (I/O) bus 206 and a standard I/O bus 208. A host bridge 210 couples processor 202 to high performance I/O bus 206, whereas I/O bus bridge 212 couples the two buses 206 and 208 to each other. A system memory 214 and a network/communication interface 216 couple to bus 206. Hardware system 200 may further include video memory (not shown) and a display device coupled to the video memory. Mass storage 218 and I/O ports 220 couple to bus 208. Hardware system 200 may optionally include a keyboard and pointing device (not shown) coupled to bus 208. Collectively, these elements are intended to represent a broad category of computer hardware systems, including but not limited to general purpose computer systems based on the Pentium® processor manufactured by Intel Corporation of Santa Clara, Calif., as well as any other suitable processor.

The elements of hardware system 200 are described in greater detail below. In particular, network interface 216 provides communication between hardware system 200 and any of a wide range of networks, such as an Ethernet (e.g., IEEE 802.3) network, etc. Mass storage 218 provides permanent storage for the data and programming instructions to perform the above described functions implemented in the system controller, whereas system memory 214 (e.g., DRAM) provides temporary storage for the data and programming instructions when executed by processor 202. I/O ports 220 are one or more serial and/or parallel communication ports that provide communication between additional peripheral devices, which may be coupled to hardware system 200.

Hardware system 200 may include a variety of system architectures; and various components of hardware system 200 may be rearranged. For example, cache 204 may be on-chip with processor 202. Alternatively, cache 204 and processor 202 may be packed together as a "processor module," with processor 202 being referred to as the "processor core." Furthermore, certain implementations of the present invention may not require nor include all of the above components. For example, the peripheral devices shown coupled to standard I/O bus 208 may couple to high performance I/O bus 206. In addition, in some implementations only a single bus may exist, with the components of hardware system 200 being coupled to the single bus. Furthermore, hardware system 200 may include additional components, such as additional processors, storage devices, or memories.

As discussed above, in one embodiment, the operations of the WLAN management server 20 described herein are implemented as a series of software routines run by hardware system 200. These software routines comprise a plurality or series of instructions to be executed by a processor in a hardware system, such as processor 202. Initially, the series of instructions are stored on a storage device, such as mass storage 218. However, the series of instructions can be stored on any suitable storage medium, such as a diskette, CD-ROM, ROM, EEPROM, etc. Furthermore, the series of instructions need not be stored locally, and could be received from a remote storage device, such as a server on a network, via network/communication interface 216. The instructions are copied from the storage device, such as mass storage 218, into memory 214 and then accessed and executed by processor 202.

An operating system manages and controls the operation of hardware system 200, including the input and output of data to and from software applications (not shown). The operating system provides an interface between the software applications being executed on the system and the hardware components of the system. According to one embodiment of the present invention, the operating system is the Windows® 95/98/NT/XP/Vista operating system, available from Microsoft Corporation of Redmond, Wash. However, the present invention may be used with other suitable operating systems, such as the Apple Macintosh Operating System, available from Apple Computer Inc. of Cupertino, Calif., UNIX operating systems, LINUX operating systems, and the like.

B.3. Wireless Client

Figure 3:
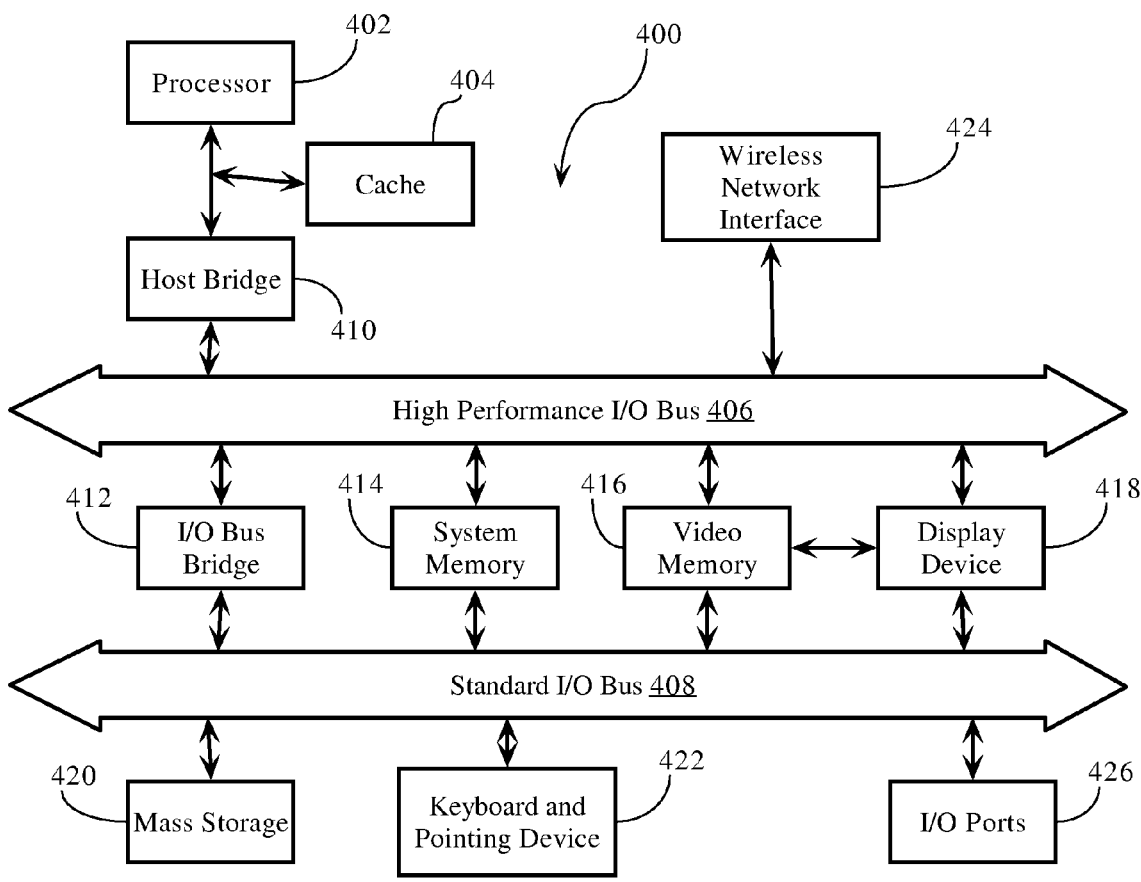
FIG. 3 illustrates an example hardware system, which may be used to implement a wireless client.

FIG. 3 illustrates an example hardware system 400, which may be used to implement a wireless client 60. In one implementation, the wireless client 60 may have a client utility application that logs connection state data that may be provided to the WLAN management server 20. In particular implementations, this functionality may be incorporated into or operate in connection with the driver or module of the wireless network interface. In particular implementations, the client utility may log event data, such as connection state transitions, as well as log transmitted and received wireless frames. The client utility may also log data and communicate the log data a central controller 42 or other network elements.

In one embodiment, hardware system 400 includes a processor 402 and a cache memory 404 coupled to each other as shown. Additionally, hardware system 400 includes a high performance input/output (I/O) bus 406 and a standard I/O bus 408. A host bridge 410 couples processor 402 to high performance I/O bus 406, whereas an I/O bus bridge 412 couples the two buses 406 and 408 to each other. Hardware system 400 also includes a wireless network interface 424, a system memory 414, and a video memory 416 couple to bus 406. In turn, a display device 418 couples to video memory 416. A mass storage 420, a keyboard and pointing device 422, and I/O ports 426 couple to bus 408. Collectively, these elements are intended to represent a broad category of computer hardware systems, including but not limited to general purpose computer systems based on the Pentium® processor manufactured by Intel Corporation of Santa Clara, Calif., as well as any other suitable processor.

The remaining elements of hardware system 400 are described below. In particular, wireless network interface 424 provides communication between hardware system 400 and any of a wide range of wireless networks, such as a WLAN (i.e., IEEE 802.11), WiMax (i.e., IEEE 802.16), Cellular (e.g., GSMA), etc. Mass storage 420 provides permanent storage for the data and programming instructions to perform the above described functions implemented in the system controller, whereas system memory 414 (e.g., DRAM) is used to provide temporary storage for the data and programming instructions when executed by processor 402. I/O ports 426 are one or more serial and/or parallel communication ports that provide communication between additional peripheral devices, which may couple to hardware system 400.

Hardware system 400 may include a variety of system architectures; and various components of hardware system 400 may be rearranged. For example, cache 404 may be on-chip with processor 402. Alternatively, cache 404 and processor 402 may be packed together as a "processor module," with processor 402 being referred to as the "processor core." Furthermore, certain implementations of the present invention may not require nor include all of the above components. For example, the peripheral devices shown coupled to standard I/O bus 408 may couple to high performance I/O bus 406. In addition, in some implementations only a single bus may exist, with the components of hardware system 400 being coupled to the single bus. Furthermore, hardware system 400 may include additional components, such as additional processors, storage devices, or memories.

In one embodiment, the operations of wireless client-side functionality are implemented as a series of software routines run by hardware system 400. These software routines, which can be embodied in a wireless network interface driver, comprise a plurality or series of instructions to be executed by a processor in a hardware system, such as processor 402. Initially, the series of instructions are stored on a storage device, such as mass storage 420. However, the series of instructions can be stored on any suitable storage medium, such as a diskette, CD-ROM, ROM, etc. Furthermore, the series of instructions need not be stored locally, and could be received from a remote storage device, such as a server on a network, via network/communication interface 424. The instructions are copied from the storage device, such as mass storage 420, into memory 414 and then accessed and executed by processor 402. In alternate embodiments, the present invention is implemented in hardware or firmware.

While FIG. 3 illustrates, for didactic purposes, the hardware architecture of a wireless client according to one implementation of the present invention, the wireless client may, however, be implemented on a wide variety of computer system architectures, such as special purpose, hand held or portable devices, Personal Digital Assistants (e.g., converged devices which support WLAN data+voice), Laptop computers, hand-held phones, and the like. An operating system manages and controls the operation of hardware system 400, including the input and output of data to and from software applications (not shown). The operating system provides an interface, such as a graphical user interface (GUI), between the user and the software applications being executed on the system. According to one embodiment of the present invention, the operating system is the Windows® 95/98/NT/XP operating system and/or Windows® CE (WinCE) operating system, available from Microsoft Corporation of Redmond, Wash. However, the present invention may be used with other operating systems, such as the Apple Macintosh Operating System, available from Apple Computer Inc. of Cupertino, Calif., UNIX operating systems, LINUX operating systems, Symbian operating systems, and the like.

C. Live Troubleshooting

Figure 4:
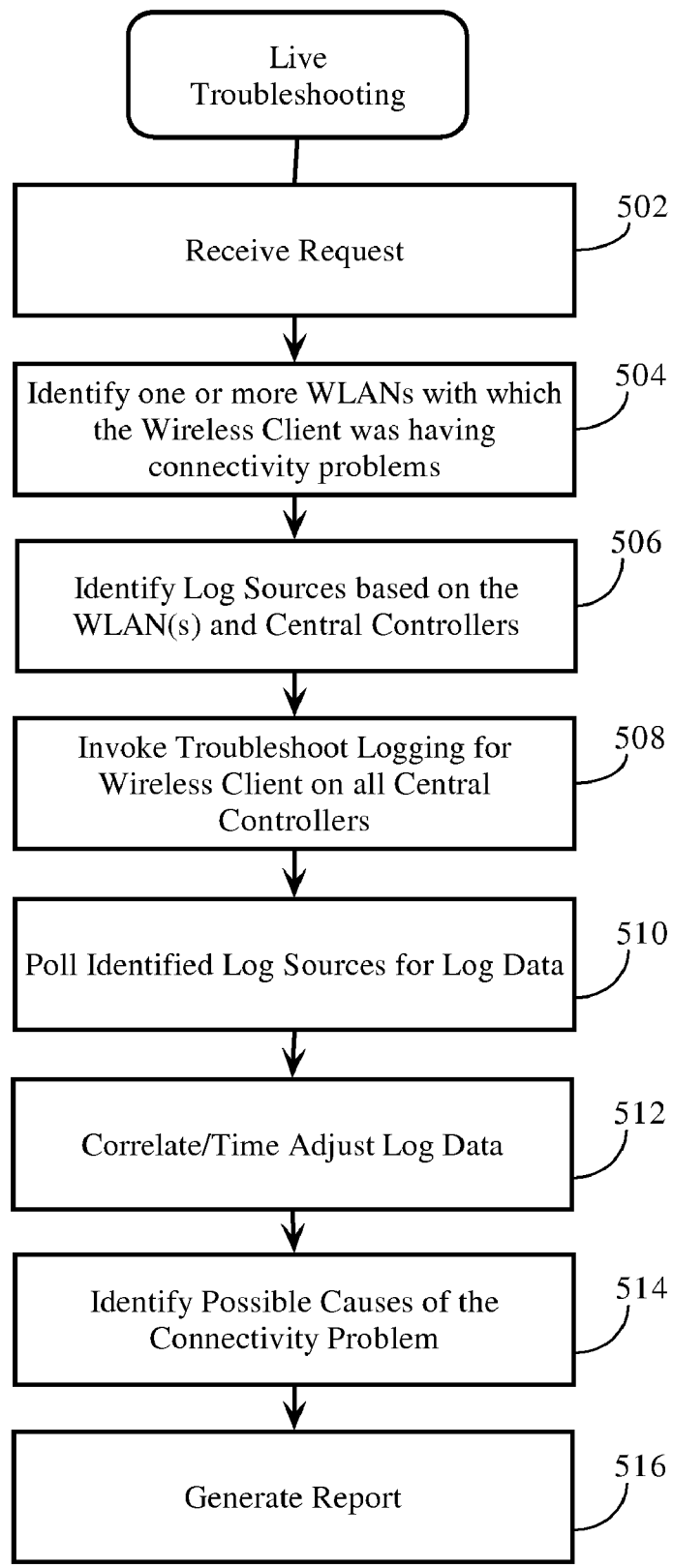
FIG. 4 illustrates an example process flow associated with live troubleshooting.

FIG. 4 illustrates an example process flow associated with live troubleshooting. In one implementation, after a network administrator becomes aware of a wireless client having a connectivity problem, the network administrator may enter identity information of the wireless client or the user of the wireless client (e.g., a Media Access Control (MAC) address, user name, Internet protocol (IP) address, etc.) into a graphical user interface (e.g., web browser). In some implementations, one item of user identifying information may be mapped to other information. For example, a network administrator may possibly identify a MAC address based on a user name, or vice versa, in an enterprise user directory. The network administrator then accesses a management interface of the WLAN management server 20 to initiate a troubleshooting function.

As FIG. 4 shows, the WLAN management server 20 receives the request for troubleshooting (502). As indicated above, the request may include user and/or wireless client identifying information, such as a user name, a MAC address, and the like. The WLAN management server 20 then determines which WLAN or WLANs the wireless client 60 was trying to access or where the wireless client 60 is having connectivity problems (504). In one implementation, the WLAN management server 20 may identify the WLANs by polling one or more central controllers 42 using Simple Network Management Protocol (SNMP) queries. Based on the wireless client identifier information, the central controller(s) 42 may provides the identities of the WLANs (e.g., service set identifiers (SSIDs)) to which the wireless client 60 has associated or attempted to connect. One or more of the central controllers 42 may provide current connection state and other information for the wireless client 60, such as a policy enforcement module (PEM) state, current access point information, operating channel, protocol identifiers, and the like.

The WLAN management server 20 then identifies sources of log data relevant to the wireless client's connectivity issue based on the WLANs and the central controller(s) identified in the polling step (506). For example, WLAN management server 20 may identify network elements, such as AAA servers, location servers, DHCP servers etc. In one implementation, WLAN management server 20 may determine from the central controller 42 other network elements that may play a role in client connection to the network. For example, in one implementation, the DHCP configuration for this WLAN may identify DHCP server. Also, a security scheme and authentication configuration may help to identify AAA servers that play a role in authenticating the wireless client. Also, the central controller 42 may contact the location server 22 to determine if the wireless client is permitted to join the network at a specific location. In particular implementations, WLAN management server 20 determines this information either directly through the central controller 42 or through a database of enterprise network information based on the network elements involved. In particular implementations, such log sources may include the wireless client 60, one or more wireless access points 50, central controllers 42, AAA servers 21, location servers 22, DHCP servers 23, routers 32, switches, and other network elements that may interact with the wireless client (such as during a protocol exchange) or observe network traffic of the wireless client 60. In one implementation, the central controller 42 may also be polled for identifying information for these log sources. For example, WLAN management server 20 may probe a central controller 42 for its primary and backup AAA servers.

In one implementation, the WLAN management server 20 invokes troubleshoot logging for the wireless client 60 on all central controllers 42 to cause the central controllers 42 to perform an augmented logging function (508). In particular implementations, the central controllers 42 collect and maintain log data associated with their own interactions with the wireless client 60. If the wireless client 60 leaves the WLAN with which a given central controller 42 is associated, the central controller 42 may preserve the log data and resume logging if the wireless client 60 returns. In one implementation, the central controller 42 may cause the client utility, if available, of the wireless client 60 to perform logging functions such as polling other network elements for log data, initiating logging of transmitted and received wireless frames, etc. In connection with the troubleshooting function, the WLAN management server 42 may also transmit a set of commands to a central controller 42, which forwards the commands to the client utility of the wireless client 60. The commands may cause the wireless client 60 to step through a set of internal diagnostics and attempt association with an identified WLAN on a specified operating channel. During this process, the client utility may log all transmitted and received frames, which may be sent (in addition to security logs, system logs, and the like) to the WLAN management server 20 for analysis.

The WLAN management server 20 also polls the identified log sources (e.g., AAA servers, DHCP servers, etc.) for log data (510). In particular implementations, the WLAN management server 20 analyzes the collected data to determine connection state transitions and thereby isolate and determine potential sources of the connectivity problems encountered by the wireless client 60. For example, the WLAN management server 20 may correlate the connection state information returned by the wireless client 60 and/or the central controller 42 with the log data of different sources to diagnose the connectivity problem. The WLAN management server 20 determines the current connection state (e.g., PEM state) of the wireless client based on analysis of the (e.g., PEM state and security type) provided by the central controller 42. Connection state transitions may include, for example, when the wireless client 60 probes, roams, associates, authenticates, receives an IP address, etc. In one implementation, the WLAN management server 20 may perform diagnostic functions associated with the wireless client 60 in order to generate more information that may be used for troubleshooting.

In one implementation, the WLAN management server 20 may also probe the wireless client 60 or other wireless network nodes for information associated with the wireless client 60 for other reasons. For example, the WLAN management server 20 may probe the location server 22 to determine the location of the wireless client 60. The WLAN management server 20 may probe the central controller 42 for a wireless access point association history within a predefined period of time (e.g., in the last 24 hours) or for wireless client-related notifications transmitted with a predefined period of time (e.g., in the last 24 hours). Such wireless client notifications may indicate any blacklist events, Wireless Encryption Protocol (WEP) decryption errors, or other security related events. The WLAN management server 20 may probe the wireless client 60 for association and/or authentication related information. During the polling process (510), the WLAN management server 20 may reference any such information that the WLAN management server 20 has already collected.

The WLAN management server 20 then correlates and time adjusts the log data from the different sources based on an expected sequence of events inherent to the wireless network and security protocols employed by the wireless client and the network infrastructure (512). The WLAN management server 20 then identifies a possible cause or causes of the connectivity problem (514). In particular implementations, when a wireless client 60 connects to the wireless network, the wireless client 60 and other wireless network elements (e.g., wireless access point, etc.) perform an expected ordered set of operations (e.g., security protocol) based a security type. In one implementation, a given sequence of events ensures that a given wireless client 60 is properly connected to the wireless network. In one implementation, the sequence of events may include multiple events and connection state transitions. For example, if the wireless client 60 connects to a wireless network using 802.1X authentication, the sequence of events may include the following: 802.11 authentication, 802.11 association, IP address assignment, etc. If the wireless client 60 connects to a wireless network using WEB authentication, the states may include 802.11 association, IP address assignment, WEB authentication, successful association, etc.

The WLAN management server 20 correlates the connection state and the log data to the expected ordered sequence of events to isolate and identify the possible causes of the connectivity problem. Because the log data is consolidated and ordered by time stamp, the WLAN management server 20 may ascertain the possible causes of the connectivity problem based on discrepancies between the log data and the expected sequence of events.

In one implementation, the WLAN management server 20 may analyze the last N events associated with the current connection state and compare the last N events against an expert database or lookup table to identify the possible causes of the connectivity problem. In one implementation, the WLAN management server 20 may analyze predefined codes to interpret log messages from the log data. For example, in one implementation, log messages from the log data associated with the DHCP server 23 may indicate particular events and/or problems:

Severity: Normal
    Message Code: 101
    Message: Controller association request message received
    Severity: Normal
    Message Code: 104
    Message: Controller client moved to DHCP required state.

Severity: Major
Message Code: 106
Message: DHCP failed. DHCP Server not up.

In one implementation, the severity indication may indicate whether an event is normal and expected event (e.g., severity=normal) or a problem (e.g., severity=major); and the message code correlates to a message in the log data.

The following is a list of other messages that the log data may provide:

Controller association request message received.

Not processing association request as client is being removed.

Ignoring association request from a client as it got excluded.

Current load on the radio of this AP is exceeded hence ignoring the request from this client.

Ignoring the association request as the client is in the exclusion list.

Ignoring the association request as the client excluded in radius server.

Ignored the association request from a client with invalid SSID IE.

Ignoring the association request from a client on a WLAN that was disabled or deleted.

Dropping association request as client didn't send aironet IE in request.

Dropping association request as client didn't send SSID IE in request.

Ignoring the association request as it does not have valid supported rates in the information element.

Ignoring the association request as 11*b* client is trying to connect 11*g* WLAN.

CCXv5 client does not have a valid supported features advertisement IE.

Ignoring the association request from a client does not support MFP, but connecting to a MFP enabled WLAN.

Ignoring the association request from a client does not support WME, but connecting to a WME enabled WLAN.

Association request received from a client has an invalid RSN IE. (One reason could be a mismatch in WPA2 algorithm).

Client moved to associated state successfully.

Client is excluded due to multiple authentication failures.

The WLAN management server 20 then generates a report (516). In one implementation, if the cause of the problem is on the wireless client side, the WLAN management server 20 sends the report to the wireless client (e.g., an e-mail to the end-user) with suggested corrective actions. If the cause of the problem is on the wireless network infrastructure side, the WLAN management server 20 sends the report to a network administrator with suggested corrective actions.

In one implementation, the WLAN management server 20 may display the report in a graphical user interface (GUI) for the network administrator to view. For example, with the example describe above, the WLAN management server 20 may display a summary screen indicating that the cause of the connectivity problem is related to the DHCP server 23 (e.g., the DHCP server 23 is down or not reachable via the central controller 42). The summary page may also include a link to another screen that displays raw log data associated with the DHCP server 23. Implementations of the GUI are described below in connection with FIGS. 9-12. In particular implementations, this live troubleshooting process may be performed on-demand or according to a schedule as described below. If the troubleshoot process is a scheduled event, the report may be stored and accessed at a later time by a network administrator.

D. Scheduled Troubleshooting

The troubleshooting functions discussed above can be accessed on-demand, as described above. The troubleshooting functionality discussed above can also be aggregated or accessed as a service available to other processes and systems, such as a trouble ticket system. In particular scenarios, the WLAN management server 20 may require additional information from the wireless client 60 or may require the wireless client 60 to perform particular actions in order for WLAN management server 20 to complete its troubleshooting process. However, the wireless client 60 may no longer be available (offline) for troubleshooting. For example, the end-user of the wireless client may open a trouble ticket indicating the connectivity problem but then go offline. A network administrator who receives the trouble ticket may then contact the end-user (e.g., by phone call or e-mail) to instruct the end-user to go online for the troubleshooting process to continue. As such, the WLAN management server 20 may invoke a scheduled trouble shooting process, as described below, where the wireless client is added to a watch list and a troubleshooting process is invoked if a connectivity problem is detected.

Figure 5:
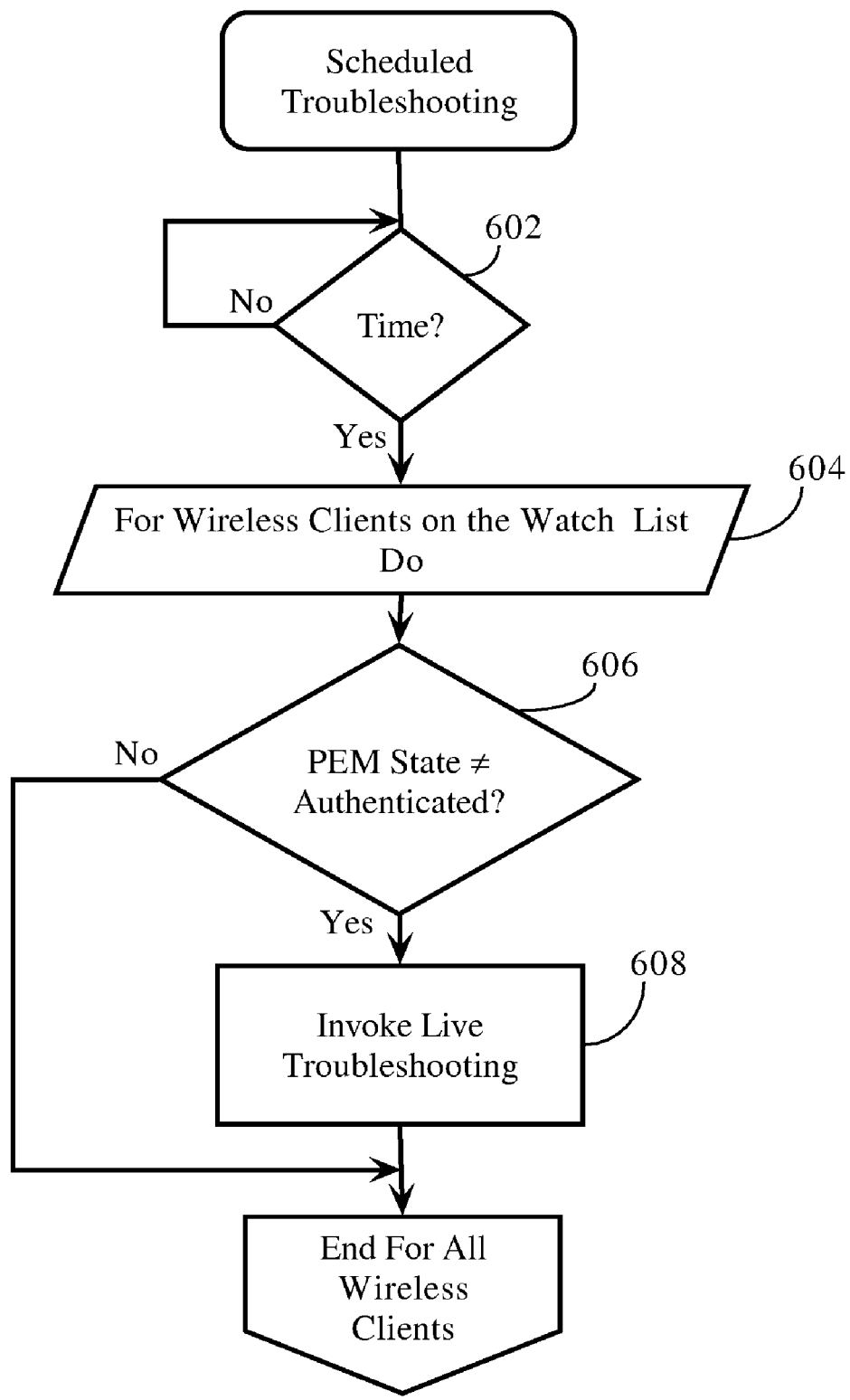
FIG. 5 illustrates an example process flow associated with scheduled troubleshooting.

FIG. 5 illustrates an example process flow associated with scheduled troubleshooting. In one implementation, the WLAN management server 20 adds the wireless client to a troubleshoot watch list. As FIG. 5 shows, at a predefined interval (602), the WLAN management server 20 checks the connection state for each wireless client on the watch list by polling the central controllers 42 for current PEM state (604). For a given wireless client 60, the WLAN management server 20 determines whether the PEM state indicates that the wireless client 60 is not authenticated (606). If the wireless client is not authenticated, the WLAN management server 20 invokes the troubleshoot process (608) described above to generate a report. If the wireless client 60 is authenticated and operably connected to the network, the process ends (610).

E. Integration with External Trouble-Ticket System

In one implementation, the WLAN management server 20 provides troubleshooting functionality that is integrated with the functionalities of an external trouble ticket system to perform live troubleshooting or scheduled troubleshooting at a future time when a trouble ticket is opened. In particular implementations, the external trouble ticket system may be a web-based interface. As described in more detail below, in particular implementations, the trouble ticket may be user-invoked or the WLAN management server may automatically initiate the troubleshooting process.

E.1. End-User Invoked Trouble Tickets

Figure 6:
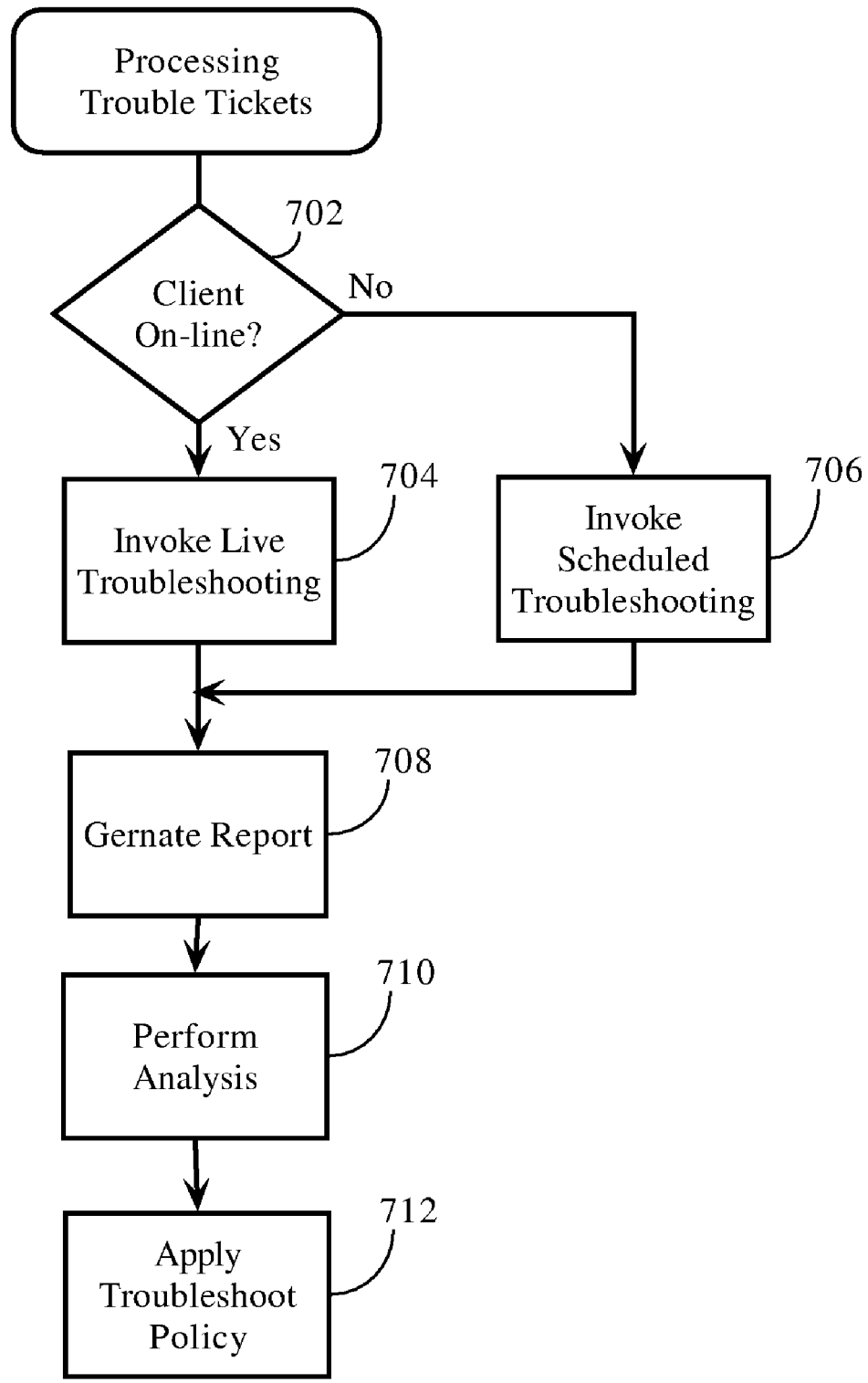
FIG. 6 illustrates an example process flow associated with processing an end-user invoked trouble ticket.

FIG. 6 illustrates an example process flow associated with processing an user-invoked trouble ticket. When a connectivity problem occurs, the end-user of the wireless client opens a trouble ticket. For example, the end-user may go to a web page of a trouble ticket system, send a message describing the problem to a network administrator, and wait for a response. The end-user may also provide a user name and e-mail address, which the network administrator may use to look up identifying information of the wireless client (such as the MAC address) or other relevant information (e.g., MAC address of the wireless access point to which the wireless client is attempting to connect). The trouble ticket server 24 may then interact with the WLAN management server 20 using an application program interface (API) such as a Simple Object Access Protocol (SOAP) API.

As FIG. 6 shows, the WLAN management server 20 determines if the wireless client 60 is online (702). If the wireless client is online, WLAN management server 20 invokes a live troubleshoot process (704) described above. If the wireless client is not online, the WLAN management server 20 schedules a troubleshoot process, adding the wireless client to a watch list (706) described above. In particular implementations, the WLAN management server 20 may send a message (e.g., e-mail) to the user instructing the user to go online.

The WLAN management server 20 then generates a report (708). In one implementation, the WLAN management server 20 sends the report to the trouble ticket system to indicate the results of the troubleshoot process. The WLAN management server 20 then analyzes the report (710) to determine whether the cause of the connectivity problem was identified, and, if identified, whether the cause of the connectivity problem was on the wireless client side or on the wireless network infrastructure side.

The WLAN management server 20 then applies a troubleshoot policy based on the analysis (712). For example, as indicated above in one implementation, if the cause of the problem is on the wireless client side, the WLAN management server 20 may send an e-mail to the wireless client with suggested corrective actions. In one implementation, the WLAN management server 20 may then close the trouble ticket and remove the wireless client from the watch list. If the cause of the problem is on the wireless network infrastructure side, the WLAN management server 20 may send a report to a network administrator with suggested corrective actions. For example, if the WEP key is incorrect, the WLAN management server 20 may suggest that the network administrator confirm the WEP Key and re-attempt connection to the wireless network. The WLAN management server 20 may also suggest that the network administrator reconfigure a particular aspect of the wireless network.

In one implementation, the WLAN management server 20 may display the report in a GUI for the network administrator to view. If the WLAN management server 20 did not identify the cause of the problem, the WLAN management server 20 may instruct the wireless client to perform one or more particular actions in order to collect more information for the troubleshooting processing. In one implementation, the network administrator may interact with the WLAN management server 20 via the GUI (described in more detail below) in order to complete the troubleshooting process. In one implementation, the WLAN management server 20 may add the wireless client to a watch list to monitor the wireless client and to send periodic asynchronous status reports to the trouble ticket system.

E.2. Automated Trouble Tickets

In one implementation, the WLAN management server 20 may monitor wireless clients to automatically determine which wireless clients have connectivity problems when such problems occur. Upon detection of a connectivity problem, the WLAN management server 20 may automatically determine possible causes of the connectivity problem according to one or more of the process flows described above. As such, the WLAN management server 20 may proactively detect problems and provide correction actions to a network administrator. In particular implementations, the WLAN management server 20 may also automatically open a trouble ticket that could get assigned to a network administrator without having an end-user have to initiate a trouble ticket.

F. Graphical User Interface

Figure 7:
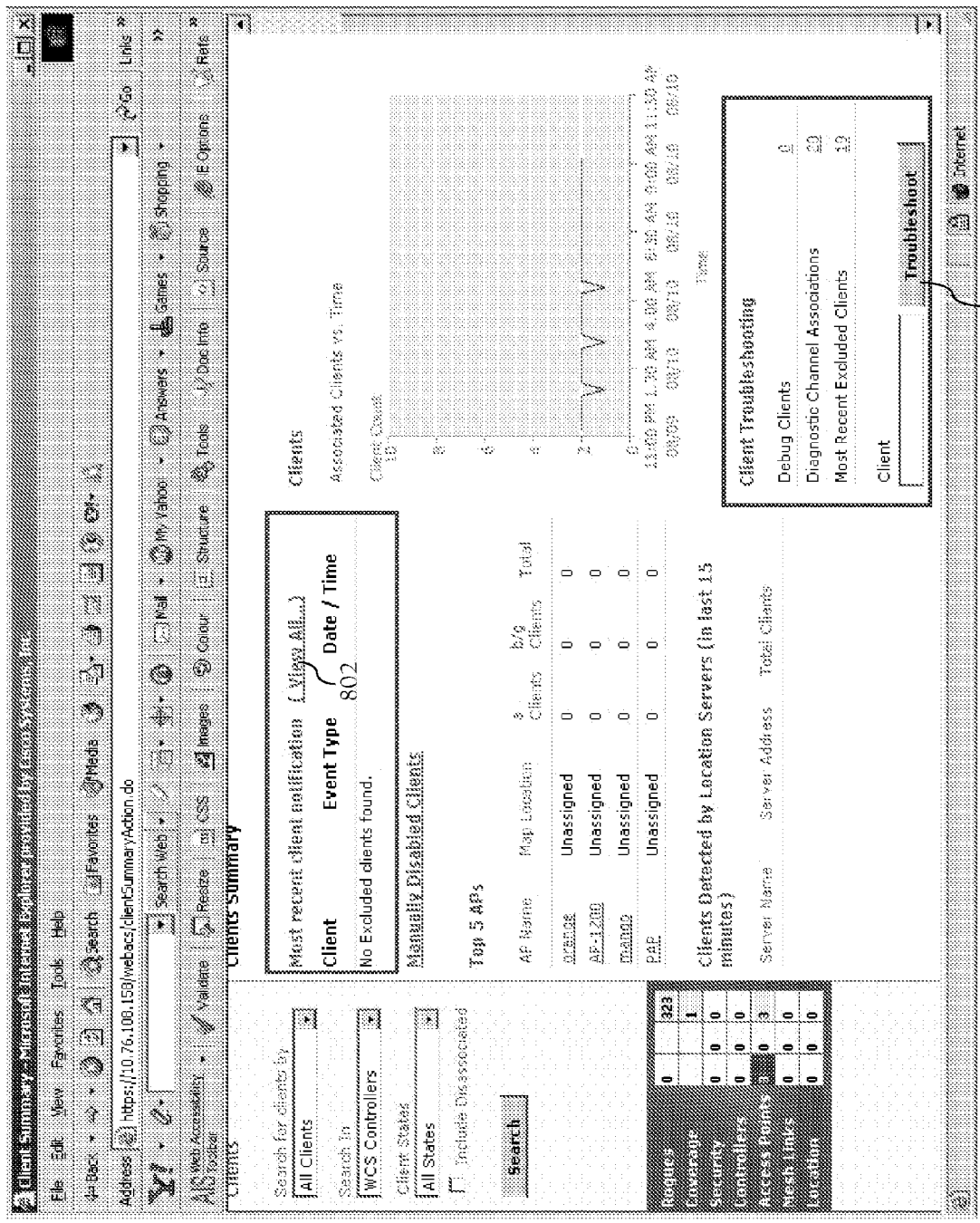
FIG. 7 illustrates an example graphical user interface showing a wireless client summary page.

FIG. 7 illustrates an example GUI showing a wireless client summary page. As FIG. 7 shows, the GUI displays summarized troubleshooting information such as recent wireless client notifications, manually disabled wireless clients, wireless clients detected by location servers, etc. In one implementation, the GUI may display the most recent wireless client notifications via a View All link 802. In one implementation, the network administrator may initiate a troubleshooting process directly from this screen using a troubleshoot command button 804.

Figure 8:
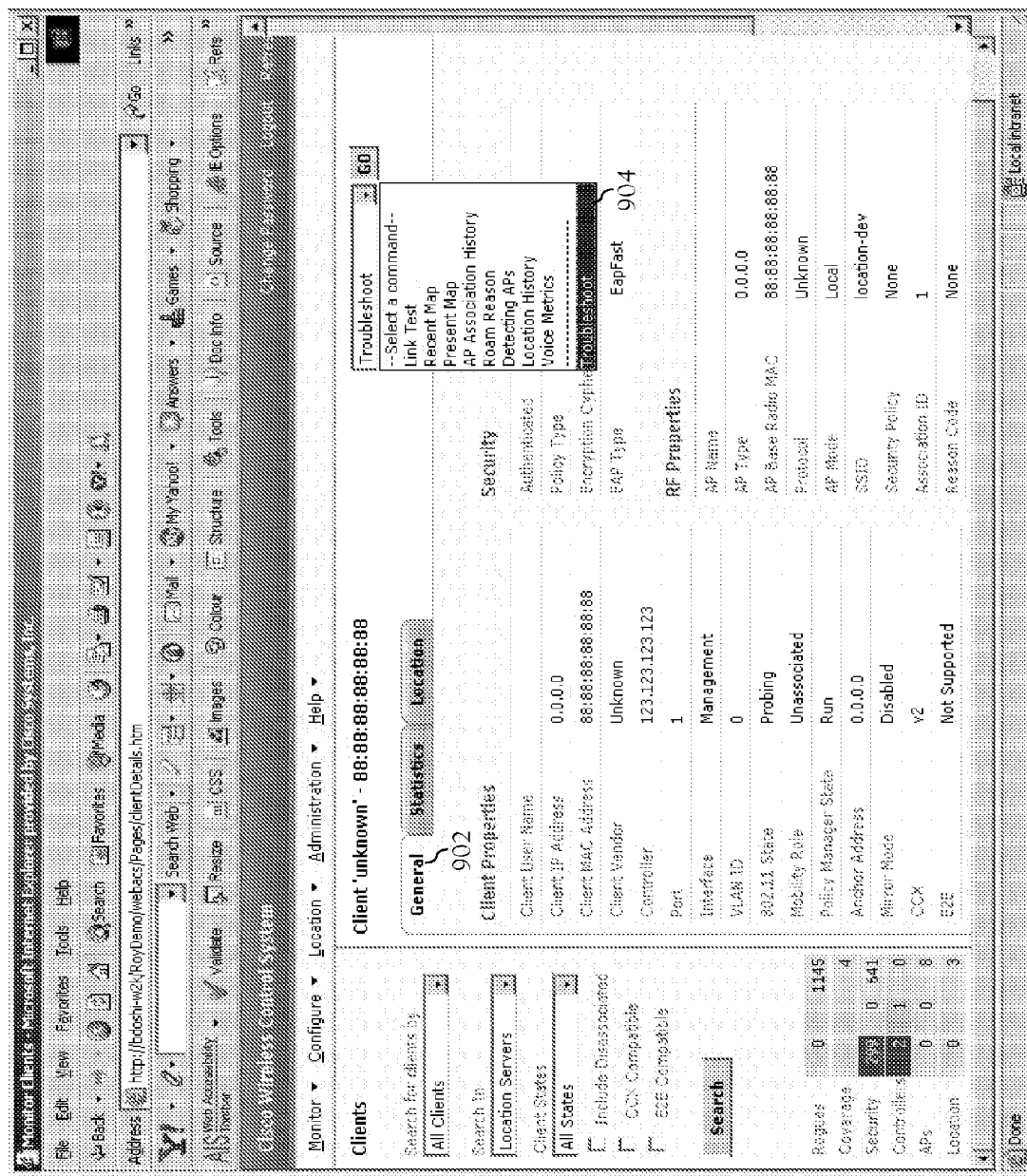
FIG. 8 illustrates an example graphical user interface showing a general information portion of a client details page.

FIG. 8 illustrates an example GUI showing a general information portion of a client details page. As FIG. 8 shows, the GUI may provide a general information tab 902, which enables the network administrator to view general information such as wireless client properties, security information, and radio frequency (RF) properties. The GUI may also display a pull-down menu 904 that enables the network administrator to view information such as link tests, maps, a wireless access point association history, detecting wireless access points, etc. In one implementation, the GUI may also enable the network administrator to perform diagnostic tests and to view the results.

FIG. 9 illustrates an example GUI showing a location information portion of the client details page. As FIG. 9 shows, the GUI may provide a location tab 906, which enables the network administrator to view wireless client location and asset information. A statistics tab 908 enables the network administrator to view a received signal strength indicator (RSSI) history, signal-to-noise ratio (SNR) history, etc.

FIG. 10 illustrates an example GUI showing a summary section of a troubleshoot wizard. In particular implementations, if the WLAN management server 20 has not already identified possible causes of the connectivity problem, the network administrator may use the troubleshoot wizard to troubleshoot the problem. As FIG. 10 shows, the GUI may provide a summary tab 1002, which enables the network administrator to view the current connection state 1004 of the wireless client, any detected problems, and suggested corrective actions. In this particular example, the current connection state 1104 in the GUI indicates that the WLAN management server 20 detected a possible problem during the key negotiation stage. As described above in connection with FIG. 5, after the WLAN management server 20 troubleshoots the connectivity problem the WLAN management server 20 then issue one or more reports that describe the results. As FIG. 10 shows, the GUI may display one of such reports. In this particular example, a report may indicate that the problem may be associated with decryption errors. The report may also display suggested corrective actions (e.g., check the share secret, key length, etc.). This information facilitates a network administrator in identifying the problem.

FIG. 11 illustrates an example GUI showing a log analysis section of the troubleshoot wizard. As FIG. 11 shows, the GUI may provide a log analysis tab 1006, which enables the network administrator to begin collecting the log data by clicking a start command button 1008 and to view the collected log data by clicking a stop command button 1010. In one implementation, the resulting log data may be categorized into different stages.

FIG. 12 illustrates an example GUI showing a test analysis section of the troubleshoot wizard. As FIG. 12 shows, the GUI may provide a test analysis tab 1012, which enables the network administrator to view all of the tests that the WLAN management server 20 may perform for the wireless client 60.

The GUI provides a selection box 1014 that enables the network administrator to select tests to be performed and provides a results box 1016 that displays the results of each test.

The present invention has been explained with reference to specific embodiments. For example, while embodiments of the present invention have been described as operating in connection with IEEE 802.11 networks, the present invention can be used in connection with any suitable wireless network environment. Other embodiments will be evident to those of ordinary skill in the art. It is therefore not intended that the present invention be limited, except as indicated by the appended claims.

What is claimed is:

1. A method comprising:
   receiving from one or more wireless network elements, connection state information associated with a wireless client having a connection problem;
   receiving from one or more network infrastructure elements log data associated with the wireless client;
   correlating the connection state information and the log data based on a network security protocol employed by the wireless client, wherein the network security protocol corresponds to an expected sequence of events, wherein the correlating comprises:
   ordering events and messages indicated in the log data based on the expected sequence of events and the connection state information; and
   comparing the correlated events and messages to a data store of diagnostic information to identify one or more possible causes of the connection problem.

2. The method of claim 1 wherein the correlating comprises comparing a plurality of last N event messages and the connection state information against possible connection problem causes in a lookup table.

3. The method of claim 1 wherein the correlating further comprises:
   determining from the log data time stamps corresponding to the events and messages; and
   ordering the events and messages based on the time stamps and the expected sequence of events.

4. The method of claim 1 further comprising displaying the one or more possible causes of the connection problem in a graphical user interface (GUI).

5. The method of claim 4 further comprising displaying a connection state of the wireless client in the GUI.

6. The method of claim 4 further comprising providing a troubleshoot wizard in the GUI, wherein the troubleshoot wizard facilitates analysis of the connection problem.

7. The method of claim 1 further comprising displaying the one or more identified possible causes of the connection problem and one or more corrective action suggestions in a graphical user interface (GUI).

8. A computer-readable storage medium encoded with computer-readable instructions operable, when executed, to cause a processor to:
   receive from one or more wireless network elements, connection state information associated with a wireless client having a connection problem;
   receive from one or more network infrastructure elements log data associated with the wireless client;
   correlate the connection state information and the log data based on a network security protocol employed by the wireless client, wherein the network security protocol corresponds to an expected sequence of events, wherein to correlate the connection state information and log data, the logic is further operable to:
   order events and messages indicated in the log data based on the expected sequence of events and the connection state information; and
   compare the correlated events and messages to a data store of diagnostic information to identify one or more possible causes of the connection problem.

9. The computer-readable storage medium of claim 8 further comprising computer-readable instructions operative to cause the processor to: compare a plurality of last N event messages and the connection state information against possible connection problem causes in a lookup table.

10. The computer-readable storage medium of claim 8 further comprising computer-readable instructions operative to cause the processor to: determine from the log data time stamps corresponding to the events and messages; and order the events and messages based on the time stamps and the expected sequence of events.

11. The computer-readable storage medium of claim 8 further comprising computer-readable instructions operative to cause the processor to: display the one or more possible causes of the connection problem in a graphical user interface (GUI).

12. The computer-readable storage medium of claim 8 further comprising computer-readable instructions operative to cause the processor to:
   display a connection state of the wireless client in the GUI.

13. The computer-readable storage medium of claim 8 further comprising computer-readable instructions operative to cause the processor to: provide a troubleshoot wizard in the GUI, wherein the troubleshoot wizard facilitates analysis of the connection problem.

14. The computer-readable storage medium of claim 8 further comprising computer-readable instructions operative to cause the processor to: display the one or more identified possible causes of the connection problem and one or more corrective action suggestions in a graphical user interface (GUI).

15. An apparatus comprising:
   one or more processors;
   a memory;
   a network interface;
   and logic encoded in one or more computer-readable storage media for execution and when executed operable to cause the one or more processors to:
   receive from one or more wireless network elements, connection state information associated with a wireless client having a connection problem;
   receive from one or more network infrastructure elements log data associated with the wireless client;
   correlate the connection state information and the log data based on a network security protocol employed by the wireless client, wherein the network security protocol corresponds to an expected sequence of events, wherein to correlate the connection state information and log data, the logic is further operable to cause the one or more processors to:
   order events and messages indicated in the log data based on the expected sequence of events and the connection state information; and
   compare the correlated events and messages to a data store of diagnostic information to identify one or more possible causes of the connection problem.

16. The apparatus of claim 15 wherein the logic is further operable to cause the one or more processors to: compare a plurality of last N event messages and the connection state information against possible connection problem causes in a lookup table.

17. The apparatus of claim 15 wherein the logic is further operable to cause the one or more processors to:
determine from the log data time stamps corresponding to the events and messages; and order the events and messages based on the time stamps and the expected sequence of events.

18. The apparatus of claim 15 wherein the logic is further operable to cause the one or more processors to: display the one or more possible causes of the connection problem in a graphical user interface (GUI).

19. The apparatus of claim 18 wherein the logic is further operable to cause the one or more processors to: display a connection state of the wireless client in the GUI.

20. The apparatus of claim 18 wherein the logic is further operable to cause the one or more processors to: provide a troubleshoot wizard in the GUI, wherein the troubleshoot wizard facilitates analysis of the connection problem.

21. The apparatus of claim 15 wherein the logic is further operable to cause the one or more processors to: display the one or more identified possible causes of the connection problem and one or more corrective action suggestions in a graphical user interface (GUI).

* * * * *